United States Patent
Fulgoni et al.

(10) Patent No.: US 7,234,390 B2
(45) Date of Patent: Jun. 26, 2007

(54) HOLDER FOR COFFEE POD

(75) Inventors: Frank Fulgoni, Sundern (DE); Hans-Josef Gerke, Sundern (DE)

(73) Assignee: Severin Elektrogerate GmbH, Sundern (DE)

(*) Notice: Subject to any disclaimer, the term of this patent is extended or adjusted under 35 U.S.C. 154(b) by 391 days.

(21) Appl. No.: 10/846,157

(22) Filed: May 13, 2004

(65) Prior Publication Data

US 2005/0005774 A1    Jan. 13, 2005

(30) Foreign Application Priority Data

May 13, 2003  (DE)  .................... 203 07 397 U

(51) Int. Cl.
*A47J 31/06*  (2006.01)
*A47J 31/00*  (2006.01)

(52) U.S. Cl. ................. 99/323; 99/295; 99/302 R

(58) Field of Classification Search ............ 99/295, 99/323, 302 R, 323.1; 239/428.5
See application file for complete search history.

(56) References Cited

U.S. PATENT DOCUMENTS

| | | | | |
|---|---|---|---|---|
| 3,635,405 A | * | 1/1972 | Shames et al. | ........... 239/428.5 |
| 3,793,933 A | * | 2/1974 | Weber | ................ 99/283 |
| 4,143,589 A | * | 3/1979 | Weber | ................ 99/282 |
| 4,739,697 A | * | 4/1988 | Roberts | .............. 99/295 |
| 4,789,103 A | * | 12/1988 | Ruhnke | ............ 239/428.5 |
| 5,392,694 A | * | 2/1995 | Muller et al. | ......... 99/295 |
| 5,644,973 A | * | 7/1997 | Kang et al. | ........ 99/289 R |
| 6,021,705 A | | 2/2000 | Dijs | |
| 6,481,338 B1 | * | 11/2002 | Wai | ................ 99/302 R |

\* cited by examiner

*Primary Examiner*—Reginald L. Alexander
(74) *Attorney, Agent, or Firm*—Andrew Wilford

(57) ABSTRACT

A coffee holder has a cup shaped to hold a coffee pod and having a radially projecting rim and a floor, a collar projecting downward from the floor, forming a downwardly open outlet passage opening upward into the cup, and having a lower end, and a screen extending across the passage at the lower end. Thus coffee is aerated as it moves along the passage through the screen.

9 Claims, 2 Drawing Sheets

HOLDER FOR COFFEE POD

FIELD OF THE INVENTION

The present invention relates to a holder for a coffee pod.

BACKGROUND OF THE INVENTION

A portafilter or holder for a coffee pod, although of course it is usable with a filter and charge of loose coffee, comprises a cup typically having a handle and formed in its floor with an outlet port. The pod itself is normally made as a short cylindrical pad filled with ground coffee and having a flange forming a radial extension of its planar upper face. In use the pod is dropped into the cup of the portafilter, the portafilter is fitted to the group head, and hot water is forced down through the pod at a pressure of 1.5 bar to 2 bar, so that the desired infusion-coffee-drips from the outlet port into one or two cups sitting underneath it.

As described in U.S. Pat. No. 6,021,705 of Dijs, the holder is formed in its floor with an array of radially extending and upwardly open grooves that terminate at the central port. Thus the liquid exiting the bottom of the pod runs along these grooves to the port, whence it drips out of the holder.

A disadvantage of this system is that the coffee produced by it does not have the froth or crema that is made by a standard commercial or pressurized system using loose ground coffee that is tamped in the holder. The lack of such crema, which increases the aroma of the espresso thus produced, is considered a serious failing by coffee afficionados. In addition the holder is particularly hard to clean, especially once the grooves develop lime deposits.

A so-called perfect-crema disk has been proposed for use in a coffee holder. It is a rubber disk with an aperture and serves mainly to increase back pressure on the grounds held in the pod. Such an accessory is largely ineffective in producing good crema, and is itself a bothersome item to deal with and maintain clean.

OBJECTS OF THE INVENTION

It is therefore an object of the present invention to provide an improved holder for a pod-type coffee machine.

Another object is the provision of such an improved holder for a pod-type coffee machine which overcomes the above-given disadvantages, that is which produces excellent crema and that is easy to clean.

SUMMARY OF THE INVENTION

A coffee holder according to the invention has a cup shaped to hold a coffee pod and having a radially projecting rim and a floor, a collar projecting downward from the floor, forming a downwardly open outlet passage opening upward into the cup, and having a lower end, and a screen extending across the passage at the lower end. Thus coffee is aerated as it moves along the passage through the screen.

In this manner it is possible, using standard preprepared coffee pods, to produce espresso having a crema just like that of a tamped charge in a standard espresso machine. The liquid that normally issues as a pressurized stream from the bottom of the portafilter is aerated as it passes through the screen, foaming nicely so that the cup has the desired appearance and taste.

The screen according to the invention can be a metallic mesh or felt. It is not intended to produce back pressure, as in pressurized portafilters, but instead merely serves to aerate the passing infusion.

According to the invention an interceptor plate is suspended on the cup underneath the collar so that coffee passing through the screen drops onto the plate. This plate serves to further increase foam/crema formation. In addition a mesh skirt can be provided extending outward from an outer edge of the interceptor plate. The skirt is downwardly concave so that the foam in the coffee is separated and flows down on the surface of the mesh while the liquid coffee passes straight through. In another system there is no plate, just the mesh shaped like an umbrella so that the coffee squirted onto it is separated into two phases, foam on the upper surface of the mesh and liquid passing through. Once again foam formation is encouraged.

In accordance with the invention support struts in the cup above the floor thereof support a coffee pod in the cup off the floor. Thus these struts, which extend radially as spokes, support the coffee pod up off the floor, creating a space for coffee to collect under the pod. This means the cup can have an easy-to-clean smooth floor. Furthermore according to the invention outer ends of the spokes are fixed to a ring and the spoke/ring assembly is separable from the cup for cleaning. To prevent coffee particles from clogging the nozzle, a mesh is held by the spokes above the floor underneath the pod.

The floor of the cup according to the invention is generally frustoconical and dished. In addition the cup rim has a recess adapted to receive a flange of a coffee pod.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
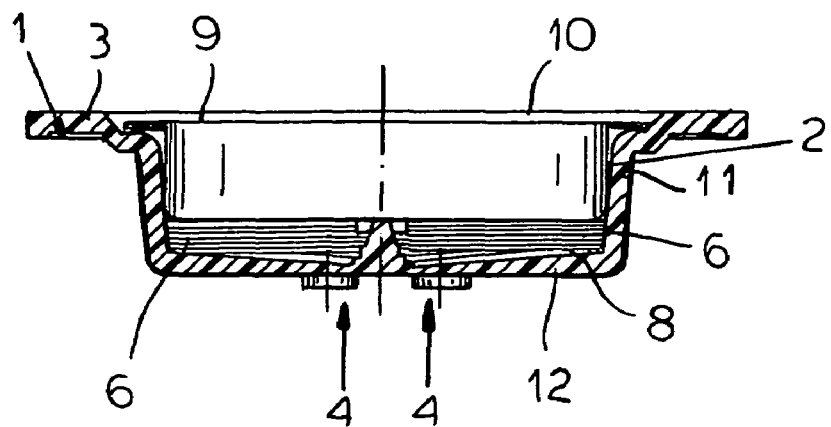
FIG. 2 is a section taken along line II—II of FIG. 1.
Figure 1:
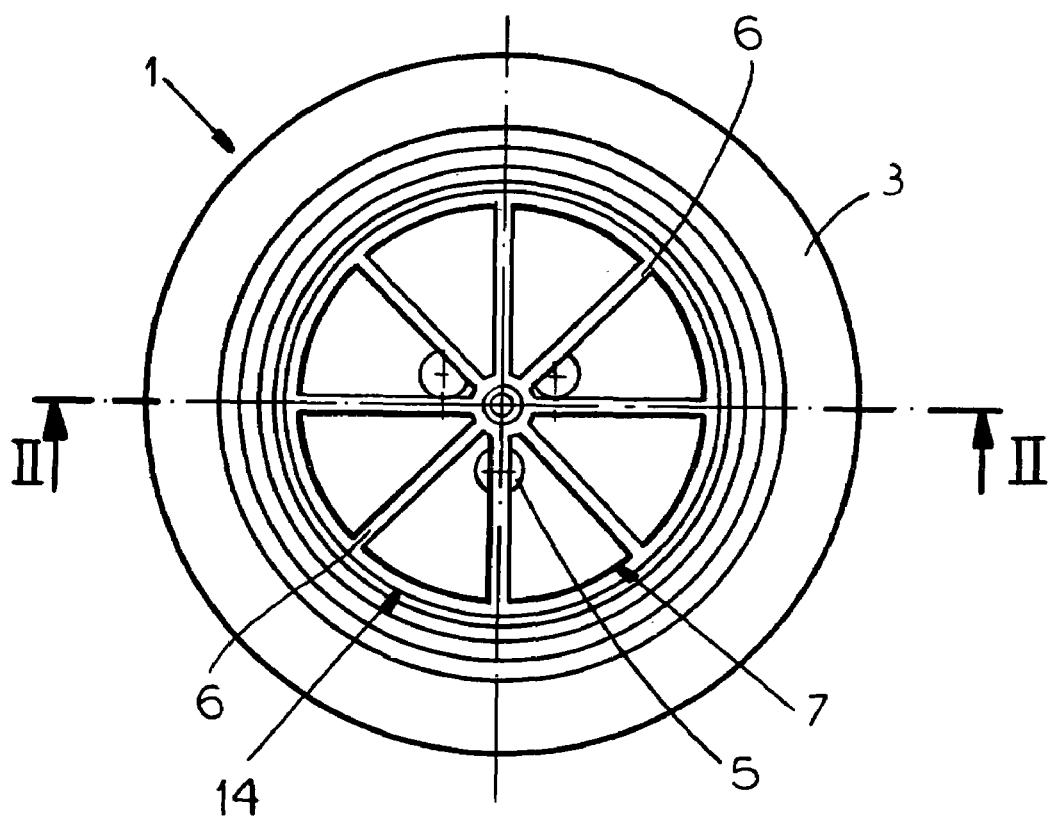
FIG. 1 is a top view of a holder and pod according to the invention.

As seen in FIGS. 1 and 2, a coffee-holder 1 according to the invention, typically formed as or fittable in the, head of a portafilter for an espresso machine, holds a standard easy-serving-espresso (ESE) pod 2 comprised of a cylindrical filter-paper bag filled with finely ground roasted coffee and having a radially projecting flange 9. The holder 1 itself is basically formed ideally of brass as an upwardly open cup having a slightly frustoconical and upwardly flared side wall 11, a planar floor 12, and a planar flange or rim 3 adapted to fit in the group head of the espresso machine and all centered on a normally upright axis A. The pod flange 9 sits in a recess 10 of the rim 3. An upper surface 8 of the floor 12 is of frustoconical shape, that is dished to the central axis A, and is formed with three throughgoing outlet holes or ports 5 that are angularly equispaced about the axis A.

Figure 3:
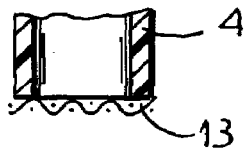
FIG. 3 is a large-scale sectional view of a detail of FIG. 1.

According to the invention as shown in FIG. 3 each port 5 is extended as an outlet collar 4 and is provided on its lower end with a screen 13. Here the screen 13 is a fine mesh of stainless steel, although other metals or even plastic materials are in theory usable. These screens 13 serve to aerate the coffee as it drips from the holder 1 and creates a crema virtually identical to that made in an espresso machine using tamped ground coffee.

In addition the holder 1 is provided sitting on the floor 12 underneath the pod 2 with a spacer 14 formed as a plurality of radially projecting spokes or struts 6 joined together at the axis A and secured to an outer ring 7 that fits loosely inside the wall 11. This spacer 14 holds the bottom surface of the pod 2 above the dished upper face 8 of the floor 12 so that liquid coffee forced out of the pod 2 can collect easily and flow along the floor surface 8 to the outlets 4, whence it drips down through the screens 13.

Figure 4:
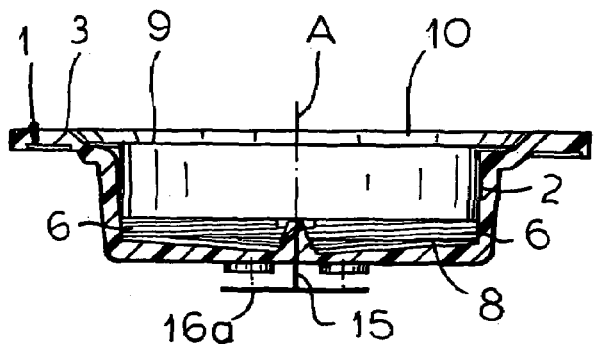
FIGS. 4, 5, and 6 are views like FIG. 1 of variants on the system of this invention.

FIG. 4 shows how a central support pin 15 can support a splash plate 16*a* formed as a small circular disk spaced below the outlet ports 5. Thus coffee exiting in effect as pressurized streams from the ports 5 impinges on this plate 16*a*, forming excellent crema or foam that drips off the outer edge into an underlying cup.

Figure 5:
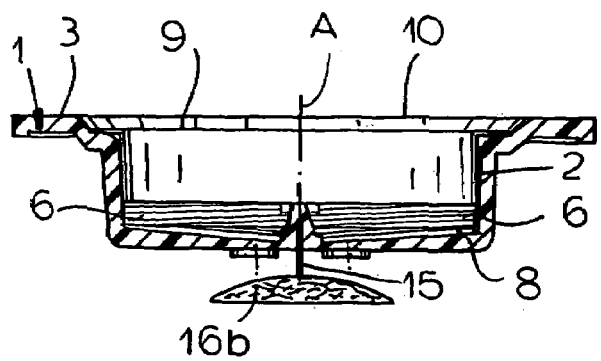

In FIG. 5 the support pin 15 carries a part-spherical and downwardly concave screen 16*b* shaped like an umbrella and centered on the axis A. With this arrangement, the combination of foam and liquid impinging on the screen 16*b* is separated into a foam component that runs radially down its upper surface to drip from its edge and a liquid component that passes essentially straight through.

Figure 6:
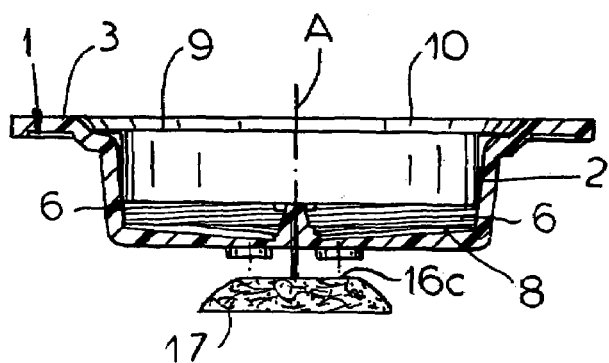

The system of FIG. 6 is a combination of that of FIGS. 4 and 5 with a central imperforate splash plate 16*c* surrounded by an annular downwardly arced screen 17. Here the foam and liquid run together to the edge of the plate 16*c* whereupon the liquid drips straight through the screen 17 while the foam runs to its outer edge and drips off.

We claim:

1. A coffee holder comprising:
   a cup shaped to hold a coffee pod and having a radially projecting rim and a floor;
   a collar projecting downward from the floor, forming a downwardly open outlet passage opening upward into the cup, and having a lower end; and
   a screen extending across the passage at the lower end, whereby coffee is aerated as it moves along the passage through the screen and having a free outer edge; and
   means including a downwardly concave mesh suspended on the cup underneath the collar for separating coffee passing through the screen and dropping on the mesh into liquid passing through the mesh and foam running downward and outward on the mesh to drop from the outer edge thereof.

2. The coffee holder defined in claim 1 wherein the screen is metallic.

3. The coffee holder defined in claim 1, further comprising:
   support struts in the cup above the floor thereof for supporting a coffee pod in the cup off the floor.

4. The coffee holder defined in claim 3 wherein the struts extend radially as spokes.

5. The coffee holder defined in claim 4, further comprising a ring in the cup to which outer ends of the spokes are fixed.

6. The coffee holder defined in claim 3 wherein the spokes are separable from the cup.

7. The coffee holder defined in claim 3 wherein the spokes are spaced above the floor.

8. The coffee holder defined in claim 1 wherein the floor of the cup is generally frustoconical and dished.

9. The coffee holder defined in claim 1 wherein the cup rim has a recess adapted to receive a flange of a coffee pod.

\* \* \* \* \*